United States Patent
Shaw et al.

(10) Patent No.: US 8,923,853 B1
(45) Date of Patent: *Dec. 30, 2014

(54) DYNAMIC PROVISIONING SYSTEM FOR POLICY-BASED TRAFFIC NAVIGATION FOR ROAMING TRAFFIC

(75) Inventors: Venson Shaw, Kirkland, WA (US); Q. James Hu, Sammamish, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 806 days.

This patent is subject to a terminal disclaimer.

(21) Appl. No.: 11/480,787

(22) Filed: Jun. 30, 2006

Related U.S. Application Data

(60) Provisional application No. 60/797,631, filed on May 4, 2006.

(51) Int. Cl.
  *H04W 4/00* (2009.01)
  *H04W 72/00* (2009.01)
(52) U.S. Cl.
  USPC ............... 455/432.3; 455/432.1; 455/433; 455/452.2
(58) Field of Classification Search
  USPC ............ 455/433, 436, 456.1, 410–411, 455/432.1–445, 450–453; 370/331
  See application file for complete search history.

(56) References Cited

U.S. PATENT DOCUMENTS

| | | |
|---|---|---|
| 5,130,983 A | 7/1992 | Heffner, III |
| 5,293,619 A | 3/1994 | Dean |
| 5,329,578 A | 7/1994 | Brennan et al. |
| 5,517,662 A | 5/1996 | Coleman et al. |
| 5,742,762 A | 4/1998 | Scholl et al. |
| 5,742,905 A | 4/1998 | Pepe et al. |
| 5,887,170 A | 3/1999 | Ansberry et al. |
| 6,052,382 A | 4/2000 | Burke et al. |
| 6,052,526 A | 4/2000 | Chatt |

(Continued)

FOREIGN PATENT DOCUMENTS

| | | |
|---|---|---|
| EP | 1091528 A2 | 4/2001 |
| EP | 1119213 A1 | 7/2001 |

(Continued)

OTHER PUBLICATIONS

U.S. Appl. No. 60/798,608, filed May 8, 2006, Shaw et al.

(Continued)

*Primary Examiner* — Michael Mapa
(74) *Attorney, Agent, or Firm* — Amin, Turocy & Watson, LLP

(57) ABSTRACT

A policy based service aware engine is provided to dynamically and/or statically provision a traffic navigation processor at a visited network according to service profiles of the home network. The service aware engine thus allows the visited network to gain full knowledge of the service to which a user subscribes, and thus, a user experience consistent with the user's home network can be obtained at the visited network. In various embodiments, the visited network's front-end-processor retrieves or receives service policies from the service aware engine of the home network, and then performs policy-based traffic navigation to intelligently handle and/or backhaul roaming traffic received by the visited network. Thus, the visited network is capable of dynamically classifying incoming roaming traffic and intelligently routing the traffic according to the service characteristics of the traffic flow for each subscriber, e.g., the need for QoS (Quality of Service) support, real time performance requirement, specific level identification, or the like.

40 Claims, 7 Drawing Sheets

(56) References Cited

U.S. PATENT DOCUMENTS

| | | | |
|---|---|---|---|
| 6,055,568 A | 4/2000 | Adams | |
| 6,167,261 A | 12/2000 | Amin | |
| 6,212,163 B1 | 4/2001 | Aida | |
| 6,292,465 B1 | 9/2001 | Vaid et al. | |
| 6,310,889 B1 | 10/2001 | Parsons et al. | |
| 6,314,106 B1 | 11/2001 | King | |
| 6,360,262 B1 | 3/2002 | Guenthner et al. | |
| 6,363,421 B2 | 3/2002 | Barker et al. | |
| 6,381,599 B1 | 4/2002 | Jones et al. | |
| 6,427,171 B1 | 7/2002 | Craft et al. | |
| 6,430,602 B1 | 8/2002 | Kay et al. | |
| 6,550,024 B1 | 4/2003 | Pagurek et al. | |
| 6,553,404 B2 | 4/2003 | Stern | |
| 6,681,386 B1 | 1/2004 | Amin et al. | |
| 6,721,796 B1 | 4/2004 | Wong | |
| 6,765,909 B1 | 7/2004 | Sen et al. | |
| 6,775,267 B1 | 8/2004 | Kung et al. | |
| 6,789,108 B1 | 9/2004 | McMillan | |
| 6,822,940 B1 | 11/2004 | Zavalkovsky et al. | |
| 6,832,241 B2 | 12/2004 | Tracton et al. | |
| 6,856,598 B1 | 2/2005 | Stanfield | |
| 6,857,020 B1 | 2/2005 | Chaar et al. | |
| 6,891,802 B1 | 5/2005 | Hubbard | |
| 6,917,610 B1 | 7/2005 | Kung et al. | |
| 6,928,471 B2 | 8/2005 | Pabari et al. | |
| 6,959,006 B1 | 10/2005 | Sarnikowski et al. | |
| 6,981,029 B1 | 12/2005 | Menditto et al. | |
| 7,027,800 B2 | 4/2006 | Haumont et al. | |
| 7,167,866 B2 | 1/2007 | Famham et al. | |
| 7,477,657 B1 | 1/2009 | Murphy et al. | |
| 7,522,581 B2 | 4/2009 | Acharya et al. | |
| 7,636,324 B2 | 12/2009 | Nassar | |
| 2001/0021175 A1* | 9/2001 | Haverinen | 370/230 |
| 2001/0053694 A1* | 12/2001 | Igarashi et al. | 455/433 |
| 2002/0031094 A1 | 3/2002 | Nitta | |
| 2002/0073338 A1 | 6/2002 | Burrows et al. | |
| 2002/0087674 A1* | 7/2002 | Guilford et al. | 709/223 |
| 2002/0143948 A1 | 10/2002 | Maher, III et al. | |
| 2002/0147828 A1* | 10/2002 | Chen et al. | 709/231 |
| 2002/0151312 A1* | 10/2002 | Rosemarijn Bos et al. | 455/452 |
| 2002/0188562 A1* | 12/2002 | Igarashi et al. | 705/40 |
| 2003/0053473 A1* | 3/2003 | Kung et al. | 370/422 |
| 2003/0088675 A1* | 5/2003 | Zheng | 709/227 |
| 2003/0108052 A1 | 6/2003 | Inoue et al. | |
| 2003/0115203 A1 | 6/2003 | Brown et al. | |
| 2003/0135339 A1 | 7/2003 | Gristina et al. | |
| 2003/0169751 A1 | 9/2003 | Pulkka et al. | |
| 2003/0177477 A1 | 9/2003 | Fuchs | |
| 2004/0032844 A1* | 2/2004 | Lewis et al. | 370/338 |
| 2004/0117794 A1 | 6/2004 | Kundu | |
| 2004/0158646 A1 | 8/2004 | Miernik et al. | |
| 2004/0162892 A1* | 8/2004 | Hsu | 709/221 |
| 2004/0177107 A1 | 9/2004 | Qing et al. | |
| 2004/0230675 A1 | 11/2004 | Freimuth et al. | |
| 2005/0058068 A1 | 3/2005 | Ben Ali et al. | |
| 2005/0086306 A1 | 4/2005 | Lemke | |
| 2005/0124302 A1* | 6/2005 | Yoon et al. | 455/90.3 |
| 2005/0204076 A1 | 9/2005 | Cumpson et al. | |
| 2005/0228892 A1 | 10/2005 | Riley et al. | |
| 2006/0030311 A1 | 2/2006 | Cruz et al. | |
| 2006/0052113 A1* | 3/2006 | Ophir et al. | 455/456.1 |
| 2006/0073810 A1 | 4/2006 | Pyhalammi et al. | |
| 2006/0129771 A1 | 6/2006 | Dasgupta et al. | |
| 2007/0064607 A1 | 3/2007 | Moon et al. | |
| 2007/0071031 A1 | 3/2007 | Shin et al. | |
| 2007/0118881 A1 | 5/2007 | Mitchell et al. | |
| 2007/0133449 A1 | 6/2007 | Schacht et al. | |

FOREIGN PATENT DOCUMENTS

| | | |
|---|---|---|
| WO | 0206968 A1 | 1/2002 |
| WO | 2007/131000 A2 | 11/2007 |
| WO | 2007131000 A2 | 11/2007 |

OTHER PUBLICATIONS

OA mailed Oct. 17, 2008 for U.S. Appl. No. 11/483,068, 18 pages.
Final OA mailed Apr. 29, 2009 for U.S. Appl. No. 11/483,068, 23 pages.
International Search Report and Written Opinion dated Apr. 3, 2008 for PCT Application Serial No. PCT/US07/67963, 24 pages.
OA Dated Oct. 17, 2008 for U.S. Appl. No. 11/479,754, 16 pages.
OA Dated Dec. 17, 2008 for U.S. Appl. No. 11/479,788, 21 pages.
OA Dated May 27, 2009 for U.S. Appl. No. 11/479,788, 15 pages.
OA Dated Apr. 16, 2009 for U.S. Appl. No. 11/479,754, 21 pages.
U.S. Appl. No. 60/798,608, filed May 8, 2006, Shaw, et al.
OA mailed Oct. 27, 2009 for U.S. Appl. No. 11/479,788, 21 pages.
OA dated Nov. 19, 2009 for U.S. Appl. No. 11/479,754, 18 pages.
OA dated Aug. 18, 2009 for U.S. Appl. No. 11/483,068, 38 pages.
OA dated Feb. 5, 2010 for U.S. Appl. No. 11/483,068, 39 pages.
Office Action mailed Mar. 19, 2010 for U.S. Appl. No. 11/479,754, 28 pages.
OA dated Apr. 29, 2010 for U.S. Appl. No. 11/479,788, 25 pages.
CA OA dated Apr. 6, 2010 for Canadian Patent Application No. 2,648,015, 3 pages.
OA dated Apr. 2, 2008 for U.S. Appl. No. 11/479,754, 16 pages. Self.
OA dated Jul. 30, 2010 for U.S. Appl. No. 11/479,754, 27 pages.
European Search Report for European Patent Application No. EP07761702 dated Jan. 11, 2012, 7 pages.
OA dated Dec. 22, 2011 for U.S. Appl. No. 11/483,068, 22 pages.
Office Action dated Sep. 23, 2013 for U.S. Appl. No. 11/483,068, 39 pages.
Verma, et al., "On Admission Control for Profit Maximization of Networked Service Providers"; May 20-24, 2002; IBM India Research Laboratory; ACM, ACM 1-5811-680-3/03/0005; url<www.conference.org/www2003/cdrom/papers/refereed/p237/p237-verma.html> Retrieved on Sep. 18, 2013, 17 pages.
Office Action dated Jul. 14, 2014 for U.S. Appl. No. 11/483,068, 36 pages.

* cited by examiner

DYNAMIC PROVISIONING SYSTEM FOR POLICY-BASED TRAFFIC NAVIGATION FOR ROAMING TRAFFIC

CROSS REFERENCE TO RELATED APPLICATION

This application claims priority to U.S. provisional application 60/797,631 filed May 4, 2006.

FIELD OF THE INVENTION

The present invention is directed to a service aware engine applicable to a home wireless network for dynamically provisioning a roaming wireless network with policy based and service aware traffic navigation intelligence for handling roaming traffic received by the roaming wireless network.

BACKGROUND

One of the most challenging issues facing telecommunications networks today is how to handle roaming traffic to and from disparate networks, which should involve not only routing plain user traffic, but also routing services that people might wish to use when they roam. Currently, the services are routed back to the home network, and there is no mechanism for the roamer to obtain the same or similar services using the "visited" (or "roaming") network in order to maintain the user's service continuity.

In this regard, current networks operate under a "bit pipe" model where the network is agnostic to the data it carries. In a bit pipe, bits representing the traffic for the home network travel through the visited network, which merely forwards those bits on for handling by the home network. Thus, a current problem is that when users roam to a visited network, all of the traffic is backhauled to the home network, treating the visited network as an unintelligent bit pipe where bits enter one end of the pipe from the user's wireless portable device and exit the pipe where forwarded to the home network, with no intelligent processing of the bits by the visited network except to ascertain the home network to which to forward the bits.

A clear problem with such networks is that the visited network does not have knowledge of what the service is that the user may be requesting through the bit pipe, and thus, even where the visited network may possess the capability to wholly or partially process the bits without involving the home network, the visited network must blindly forward or "backhaul" the bits to the home network for processing.

However, there are transport costs to the home network for handling roaming traffic to/from the home network. For instance, the home network operator is required to pay the GRX interconnection provider to backhaul all the traffic to the home network from the visited network in this manner. Moreover, the home network must allocate resources to handle roaming traffic received from visited networks as well as traffic received directly by the home network. This can become expensive when home network traffic is already congested during busy hours, as a result of which, the home network needs to over-provision its capacity and processing load in order to support additional roaming traffic. As a result, the user experience is inconsistent and unmanageable when user is roaming and trying to request services.

Accordingly, it would be advantageous to allow visited networks to process some roaming traffic directly without passing the data blindly back to the home network. It would be further desirable to define a mechanism that allows a visited network to dynamically analyze whether roaming traffic should be forwarded to the home network, or processed directly by the visited network. It would be still further desirable to provide policy based service awareness in connection with such a mechanism in order to classify a service that is requested in a visited network and to apply one or more policies from the home network to the classification by the visited network to determine how resulting traffic should flow to satisfy requests for service on the visited network.

Solutions to these and other deficiencies of the state of the art of roaming in telecommunications networks are thus desirable.

SUMMARY OF THE INVENTION

In consideration of such needs in the art, the invention provides a policy based service aware engine to dynamically and/or statically provision a traffic navigation processor at a visited network according to service profiles of the home network. The service aware engine thus allows the visited network to gain full knowledge of the service to which a user subscribes, and thus, a user experience consistent with the user's home network can be obtained at the visited network. In various embodiments, the visited network's front-end-processor retrieves or receives service policies from the service aware engine of the home network, and then performs policy-based traffic navigation to intelligently handle and/or backhaul roaming traffic received by the visited network. Thus, the visited network is capable of dynamically classifying incoming roaming traffic and intelligently routing the traffic according to the service characteristics of the traffic flow for each subscriber, e.g., the need for QoS (Quality of Service) support, "real time performance requirement, specific level identification, or the like.

Other features of the invention are described in more detail below.

BRIEF DESCRIPTION OF THE DRAWINGS

The policy based service aware engine in accordance with the invention is further described with reference to the accompanying drawings in which.

DETAILED DESCRIPTION OF ILLUSTRATIVE EMBODIMENTS

Overview

As described in the background, current "bit pipe" network models don't allow visited networks (or roaming networks) to provide services to a user as if a user was on the user's home network, since the visited networks merely forward the traffic to the home network where services are required. The home network provides the service, and then the visited network merely forwards any service related data to the user as bits for intended for the user. However, there is no intelligence or service awareness in the visited network about the services to which the subscriber is subscribed to provide a comparable experience.

Accordingly, the invention uses a policy based service aware engine in a home network to dynamically provision a traffic navigation processor at a visited network according to a particular service profile for the roamer. This allows the visited network to gain full knowledge of the services to which the user has privileges and thus, a seamless user experience can be provided at the visited network that is consistent with the experience the user would receive at the home network.

Once the service aware engine provisions the navigation processor of the visited network, the visited network's front-end-processor can perform policy-based traffic routing for roaming traffic received at the visited network. Thus, the roaming traffic can be handled/routed based on policies pertaining to characteristics of the service request received at the visited network. For instance, the need for QoS (Quality of Service) support for the service--a real time performance requirement for the service, a specific level identification for the service, or the like, can be taken into account when the visited network makes an intelligent decision with respect to routing or handling a request for service received as roaming traffic.

Figure 1:
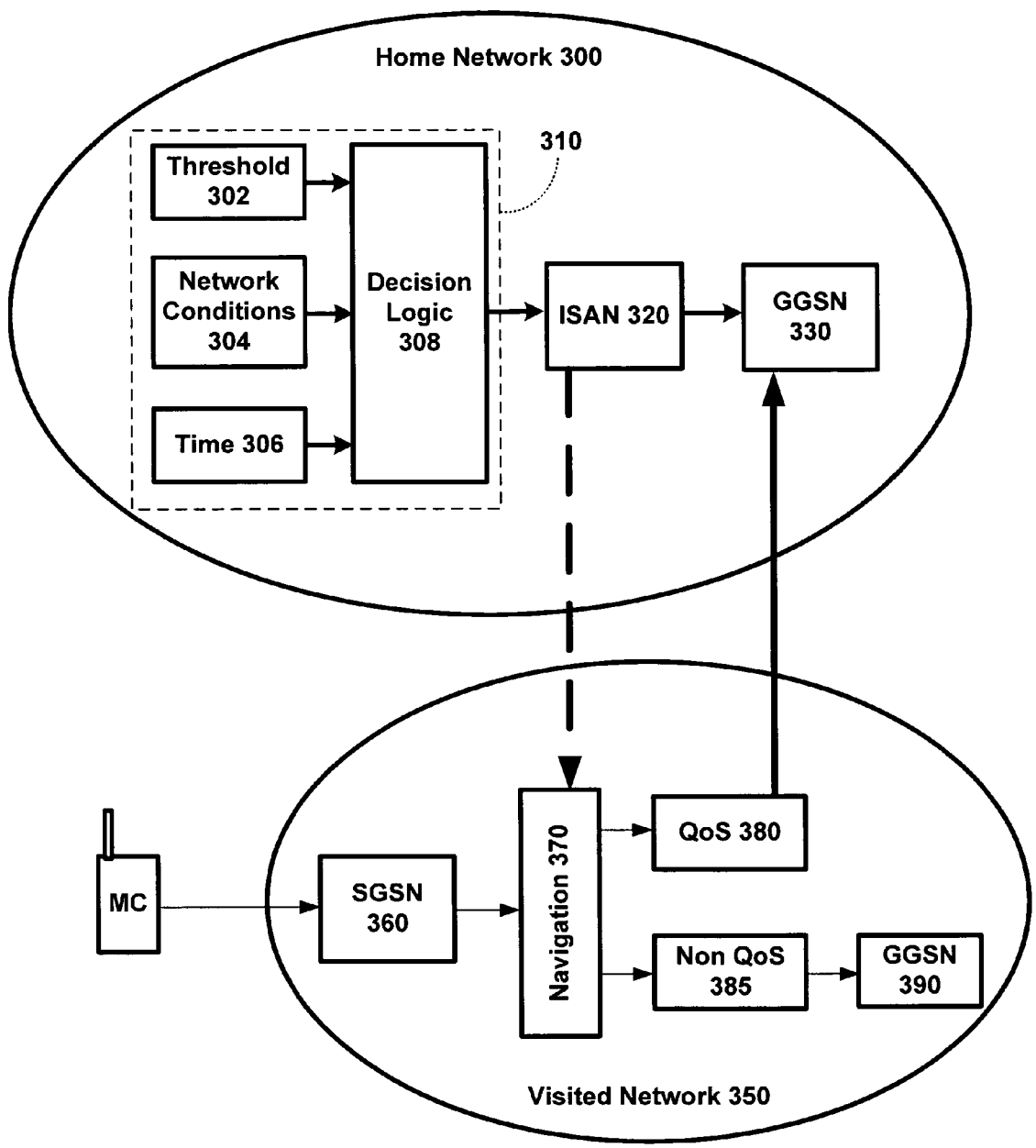
FIG. 1 illustrates a first exemplary, non-limiting embodiment of a service aware engine of a home network in accordance with the invention.

Dynamic Provisioning System for Policy-Based Traffic Navigation while Subscriber Roaming FIG. 1 illustrates a first exemplary, non-limiting embodiment of a service aware engine 310 of a home network 300 in accordance with the invention. As shown in the illustration, service aware engine 310 may include a threshold component 302, a network conditions component 304 and a time component 306, or the like, as inputs to a decision logic component 308. In operation, the visited network 350 receives a service policy update from the home network's service aware engine 310 to provision the visited network 350 for incoming roaming traffic, e.g., from a user's mobile client MC. The decision logic 308 of service aware engine 310 periodically sends the service provisioning information to the visited network 350 based on a threshold defined by threshold component 302, a network condition defined by network conditions component 304, and/or a time duration defined by time component 306. The decision logic component may forward the service provisioning information to the visited network 350 via an intelligent service aware network component 320, or other forwarding mechanism, which communicates service information including information about the services supported by home network 300 and associated policy information to the visited network 350.

As determined by analyzing the service provisioning information received from the home network 300, in one embodiment, the visited network 350 only backhauls roaming traffic to the home network 300 when the service requires QoS. Otherwise, the service is directly processed at the visited network 350 without intervention from the home network 300. For instance, as shown in the diagram of FIG. 1, when mobile client MC (a subscriber of home network 300) connects to SGSN 360 of visited network 350 as part of roaming service by visited network 350, a request for a service by the user is routed to a navigation component 370 which, having been provisioned with service information by home network 300, operates to intelligently classify the request for service. If, as a result of such classification, it is determined by QoS logic 380 that the request is one for which QoS is required (e.g., for a premium service of home network 300), then the request for service is forwarded to GGSN 330 of home network 300. However, if the request for service does not require QoS as determined by Non QoS logic 385, as is often the case, then the request for service is forwarded to GGSN 390 of visited network 350 to be carried out within visited network 350. Thus, advantageously, for a great number of requests for service that take place on a visited network 350, the requests need not be forwarded back to the home network 300 for processing, thereby avoiding the problems with "bit pipe" roam forwarding of prior systems.

By way of further background, a call session control function (CSCF) can act as a Proxy CSCF (P-CSCF), Serving CSCF (S-CSCF), or Interrogating CSCF (I-CSCF). In this regard, a CSCF can serve as a centralized routing engine, policy manager, and policy enforcement point to facilitate the delivery of multiple real-time applications using IP transport. A CSCF is application-aware and uses dynamic session information to manage network resources (feature servers, media gateways, and edge devices) and to provide advance allocation of these resources depending on the application and user context. The P-CSCF is the first contact point within the Interactive or IP Multimedia System (IMS) for the subscriber. The P-CSCF accepts requests and serves them internally or forwards them. The I-CSCF is the contact point within an operator's network for connections destined for a user of that network, or for a roaming user currently located within that network's service area. There may be multiple I-CSCFs within an operator's network. Finally, the S-CSCF is responsible for identifying the user's service privileges, selecting access to the home network application server, and providing access to that server.

In one non-limiting embodiment of the invention, the first time a roamer connects to a visited network, the proxy call session control function (P-CSCF) of the visited network is contacted and then the P-CSCF contacts the interrogating call session control function (I-CSCF). The I-CSCF then sends a proxy request to an intelligent service aware network (ISAN) component at the home network, and the service aware engine of the invention may then use protocols, such as SIP, to communicate dynamic service provisioning information to the visited network. The ISAN component may be, for instance, an intelligent service aware network as described in commonly assigned copending U.S. patent application Ser. No. 11/483,068, entitled "Intelligent Service Aware Network."

Figure 2A:
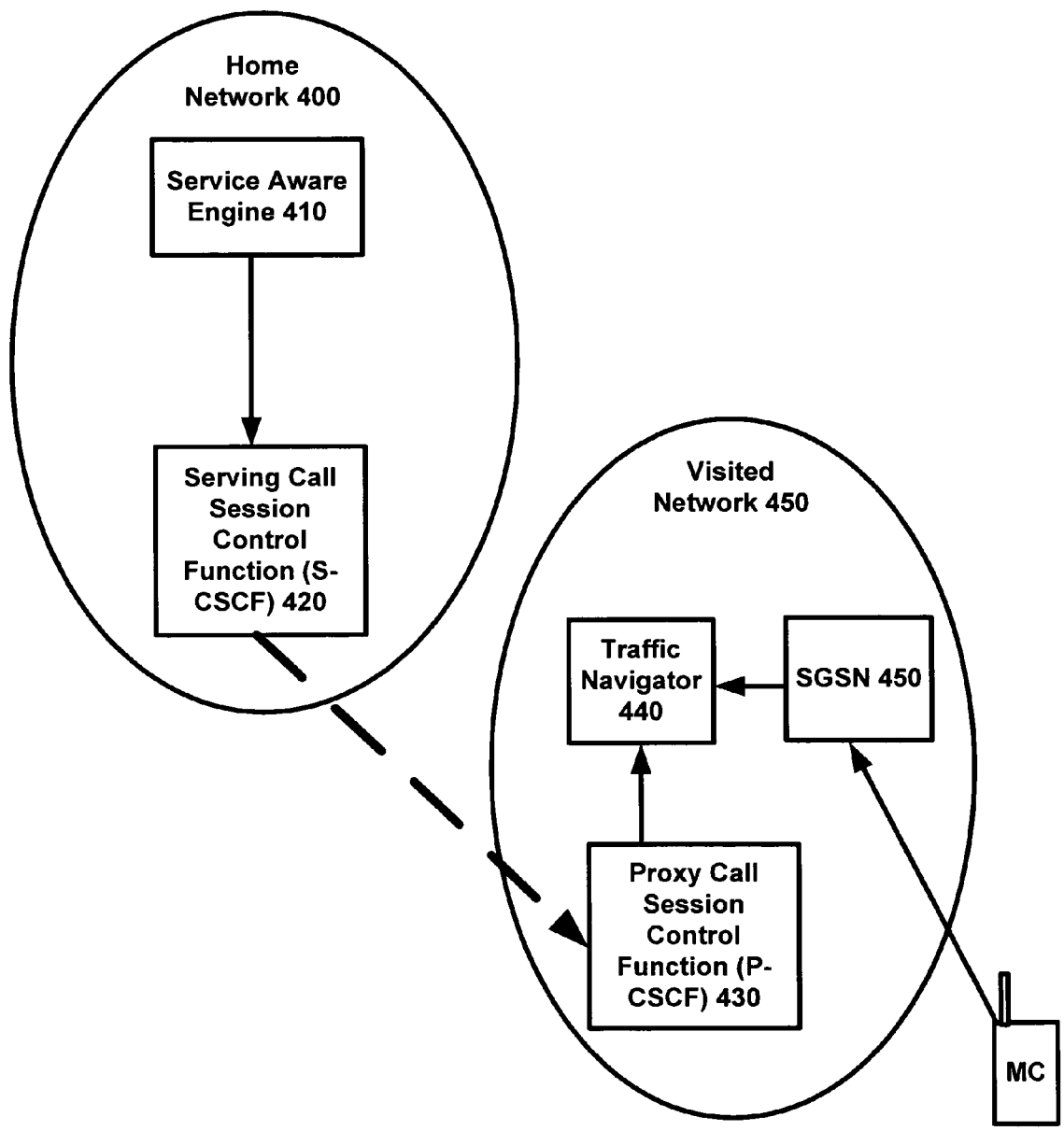
FIGS. 2A and 2B illustrate exemplary non-limiting block diagrams showing alternate implementations of a service provisioning process for transmitting service provisioning information from a home network to a visited network in accordance with the invention.

FIG. 2A illustrates an exemplary non-limiting block diagram showing an implementation of a service provisioning process for transmitting service provisioning information from a home network to a visited network in accordance with the invention. The service aware engine 410 of home network 400 passes subscriber and corresponding service information to S-CSCF 420, and that information is further passed to P-CSCF 430 of the visited network 450 which allows the traffic navigator component 440 to determine whether the roaming traffic for a particular roaming user can be directly processed at the visited network 450, or should be backhauled and processed at the home network 400, e.g., for QoS reasons, or other reasons tending to dictate that the home network 400 is better suited to processing the user request received at SGSN 450 of the visited network 450 from mobile client MC.

Figure 2B:
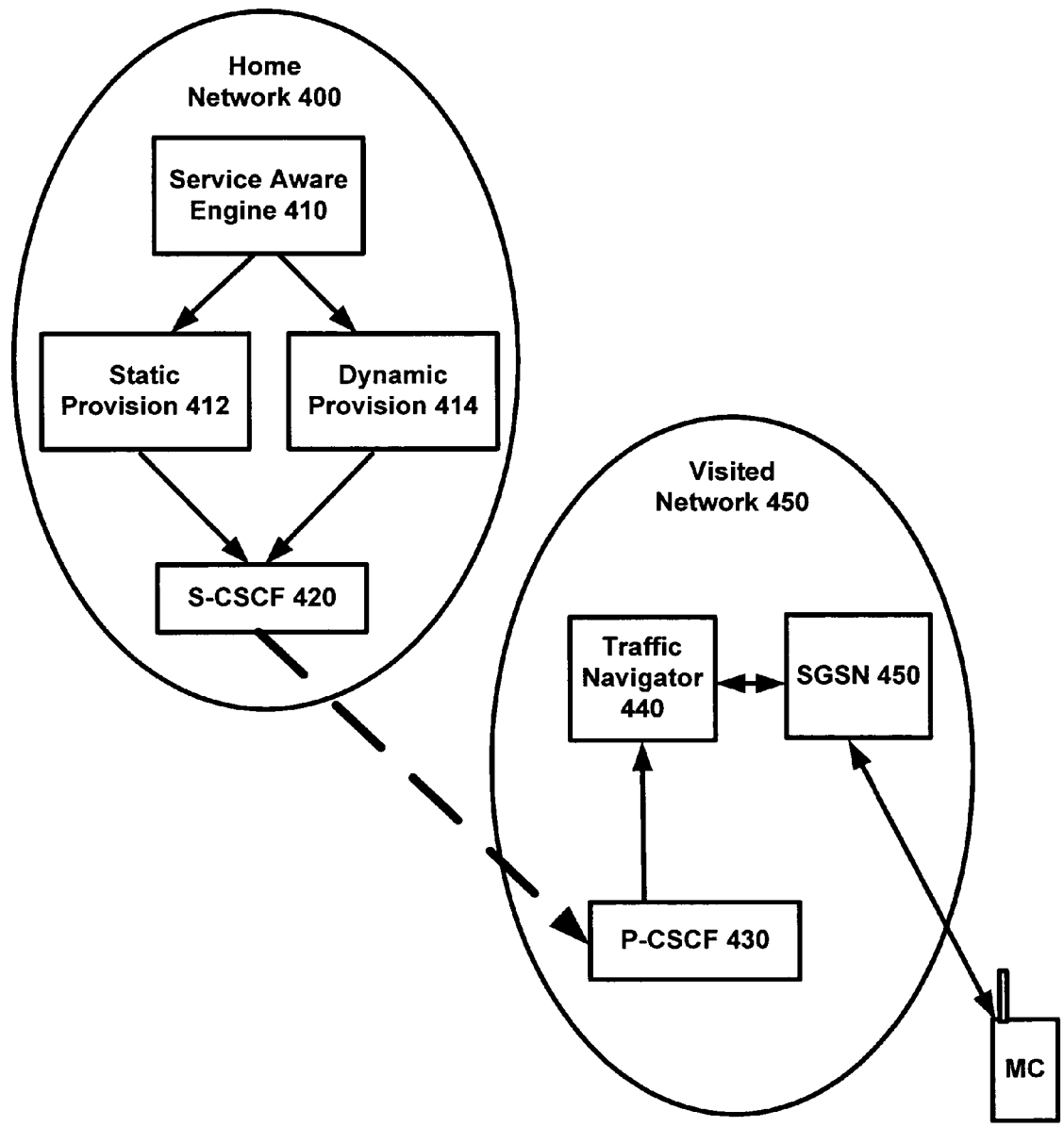

FIG. 2B illustrates an exemplary non-limiting block diagram illustrating an alternate implementation of the service provisioning process of the invention wherein the service provisioning information is transmitted from a home network to a visited network. As shown, the service aware engine 410 can either statically or dynamically provision the traffic navigator 440 at the visited network 450 via static provisioning component 412 or dynamic provisioning component 414, respectively.

Any static provisioning of traffic navigator 440 can be performed by static provisioning component 412 at a predetermined time and time interval, e.g., at midnight GMT every 24 hours for global consistency. Dynamic provisioning performed by dynamic provisioning component 414, in contrast, can happen at any time when pre-determined conditions dictate that such provisioning should occur based on real-time parameters. For instance, dynamic provisioning can be performed according to one or more real-time network conditions or parameters, e.g., when traffic on home network 400 is inhibited due to one or more parts of the network going down, when the traffic on home network 400 becomes congested according to a measure of network bandwidth, or based on a predetermined threshold when traffic on home network 400 reaches a pre-defined level or warning (e.g., to avoid congestion prior to its occurrence). When one or more of such triggering network conditions is observed by a network logic component of home network 400, the service aware engine 410 dynamically provisions the visited network 450 in accordance with the invention.

Thus, in accordance with the invention, a home network can supply service and user information to a visited network so that the roaming traffic can be backhauled to the home network only when pre-defined circumstances occur that optimize traffic flows. Depending on the circumstances, one can appreciate that the traffic flows can be optimized by navigator 440 to optimize traffic flow of home network 400, to optimize traffic flow of visited network 450, or to simultaneously optimize traffic flow for both networks. The invention thus advantageously provides a cost saving benefit for the home network 400 since the network capacity does not need to be over-provisioned to accommodate the backhauled roaming traffic from visited network 450. At the same time, transport expenses for any required GRX interconnects are advantageously reduced since the invention can be utilized to significantly reduce the amount of roaming traffic for backhaul to the home network 400 by allowing the visited network 450 to process service requests directly (e.g., voice calls which can be handled by the visited network 450 with relative ease).

In one embodiment, navigator 440 includes a front end processor on the visited network 450, which is directly provisioned by the service aware engine 410 of the invention so that the incoming traffic can be navigated at the visited network 450. The traffic navigator 440 performs the parsing to separate traffic that does not require QoS support, and that traffic can be directly processed at the visited network 450 without consuming home network processing load and resource reservation.

The navigator 440 further directs traffic that requires QoS support back to the home network 400 so that optimal home network resources and processing load can be allocated and consumed to support adequate QoS for such high priority traffic as needed. The navigator 440, having been provisioned by the service aware engine 410 of the invention, also determines whether a home network QoS requirement is implicated based on the home network's policy management function (PMF) and/or service level agreement (SLA) between the operators. Moreover, the visited network navigator 440 can continuously communicate with the home network 400 to update service policy information from the home network 400 so that the visited network's processing of roaming traffic does not inhibit adequate QoS for a subset of high priority services set according to the home network policy.

Figure 3:
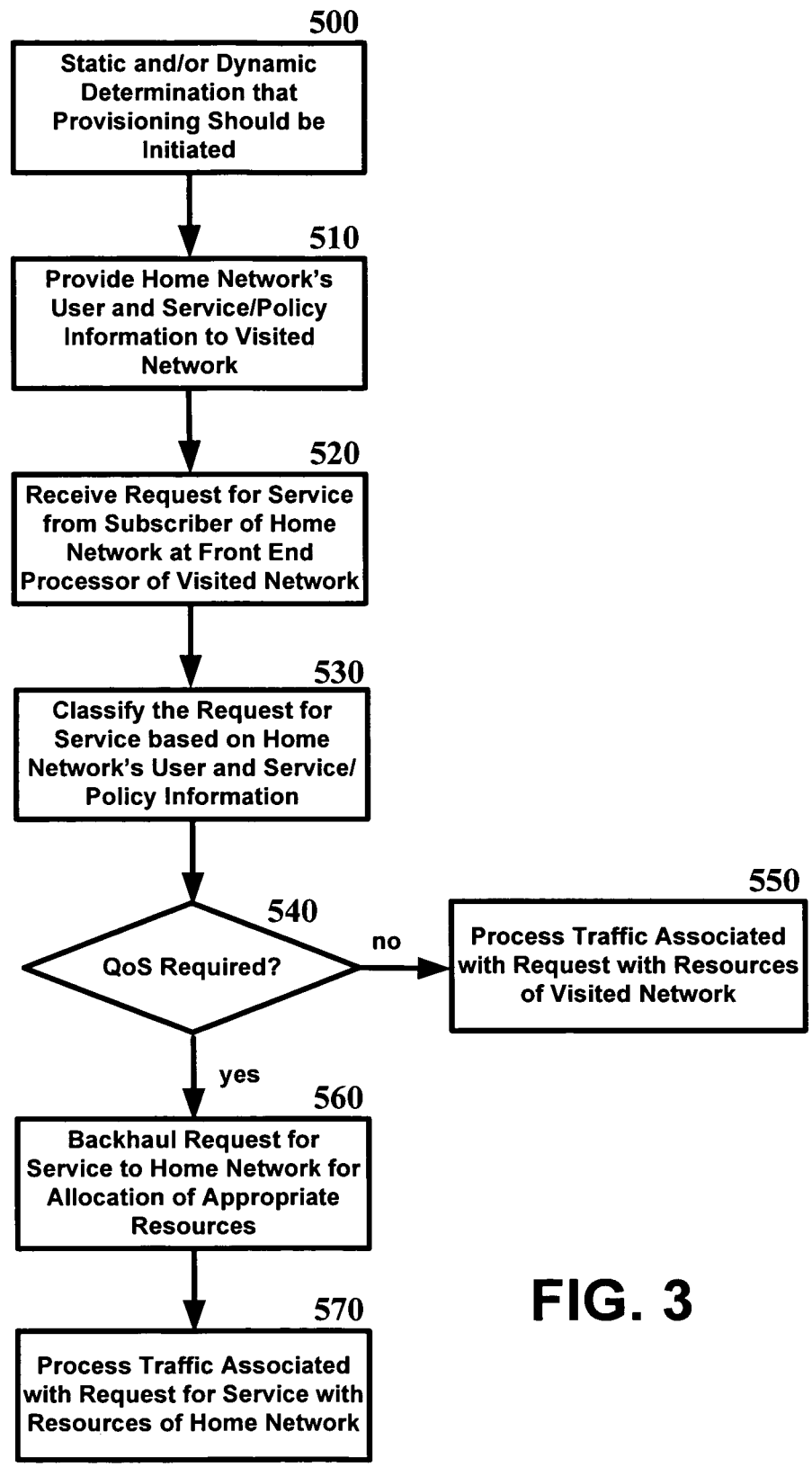
FIG. 3 illustrates an exemplary non-limiting flow diagram that shows intelligent provisioning of a visited network with user and service/policy information of a home network so that the visited network can process non-QoS requests and QoS requests can be backhauled to the home network in accordance with the invention.

FIG. 3 illustrates an exemplary non-limiting flow diagram that illustrates the intelligent provisioning of a visited network with user and service/policy information of a home network so that the visited network can process non-QoS requests on behalf of subscribers of the home network roaming on the visited network in accordance with the invention. At 500, logic at the home network, e.g., part of an intelligent service aware network, determines that user and service/policy information should be provided to the visited network based on static algorithms (e.g., periodically) or dynamic algorithms that take dynamic parameters into account (e.g., network conditions, congestion levels, or the like). At 510, the home network's user and service/policy information is communicated to the visited network, e.g., a navigation component suited to receive the information and apply the service policies for subscribers of the home network to traffic on the visited network.

At 520, a subscriber of the home network makes a request for service while roaming on the visited network. At 530, the visited network classifies the request for service based on the home network's user and service information and underlying policies that the home network applies to service requests. At 540, based on the classifying, it is determined whether QoS (or other high priority request) is implicated by the user's request. At 550, if QoS is not required (e.g., for regular voice traffic), then the processing and traffic associated with the user's request is handled by the visited network. At 560, if it is determined at 540 that QoS is required, then the request for service is backhauled to the home network where the home network allocates the required resources to achieve the QoS requirements. At 570, the request for service is processed with the resources of the home network. Where the request for service implicates return traffic to the subscriber, whether the request for service includes QoS requirements or not, the resulting traffic from processing the request for service is returned to the user from or via the visited network.

There are many advantages to the dynamic and/or static techniques for provisioning a visited network with a home network's policy management framework for services so that the visited network can intelligently parse traffic on behalf of a home network.

First, the processing load and resource reservation for roaming traffic at the home network is reduced and costs are saved as a result. Also, the visited network traffic parsing rules are consistent with the home network policy management server, thereby providing a seamless experience to a user regardless of which network handles a given request for service. Additionally, the front end processor for performing roaming traffic parsing on the visited network can be implemented in relatively low cost software, firmware, or hardware, so that any visited network architecture can be accommodated. Further, network operators are given a standard way of communicating service related information among one another. Moreover, the service information is policy based so it can be in the form of an existing SLA, which may be readily available and thus a simple matter to implement as between the given parties to the SLA. For a similar reason, the service information maintained by the service aware engine of the invention, and communicated to the visited network based on static/dynamic provisioning logic, can be used to enforce service and network policies of both parties.

Furthermore, the front end processor of the visited network is able to intelligently navigate, or route, the incoming traffic at the visited network so that traffic which does not require QoS support can be processed separately and directly at the visited network without consuming home network processing loads and available resources. The front end processor also only navigates or routes traffic back to the home network where QoS support is required and thus transport costs for interconnection (e.g., GRX, lease line, VPN, etc.) may be vastly reduced among operators that take advantage of the techniques of the invention.

Still further, the invention advantageously provides a navigator component at the visiting network that allows the home network to consume minimum network resources and processing loads in order to support adequate QoS requirements according to the home network policy management function and any SLA between the operators. In this regard, since the navigator component of the invention provided to the visited network can continuously communicate with the home network policy management function, the visited network navigator can continuously maintain updated service policy information, when needed or appropriate, so that the navigator can provide adequate and up to date QoS support for services according to the home network policy. With regard to payment for services, since the mechanism of the invention involves a standardized understanding as between operators of underlying service processing policies, the system can be used in connection with standard charging and billing mechanisms, such as those defined by 3GPP, GSMA, and the like. Finally, since the invention does not redefine service definitions or standards, the system of the invention can support Interactive Multimedia Service (IMS) and 3G Universal Mobile Telephone System (UMTS) Commercialization standards, and like standards, and thus any of the variety of now existing or future services can be accommodated within the architecture of the invention.

Exemplary Non-Limiting Network and Operating Environments

The above-described architecture for provisioning a visited network with policy based service information from a home network may be applied to any networks, however, the following description sets forth some exemplary telephony radio networks and non-limiting operating environments for the architecture of the present invention. The below-described operating environments should be considered non-exhaustive, however, and thus the below-described network architecture merely shows an exemplary network architecture in which the present invention may be incorporated. One can appreciate, however, that the invention may be incorporated into now existing or future alternative architectures for communication networks as well.

The global system for mobile communication ("GSM") is one of the most widely utilized wireless access systems in today's fast growing communication systems. GSM provides circuit-switched data services to subscribers, such as mobile telephone or computer users. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

As one of ordinary skill in the art can appreciate, the exemplary GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the techniques of the invention may be applied independently of the method of data transport, and does not depend on any particular network architecture, or underlying protocols.

Figure 4A:
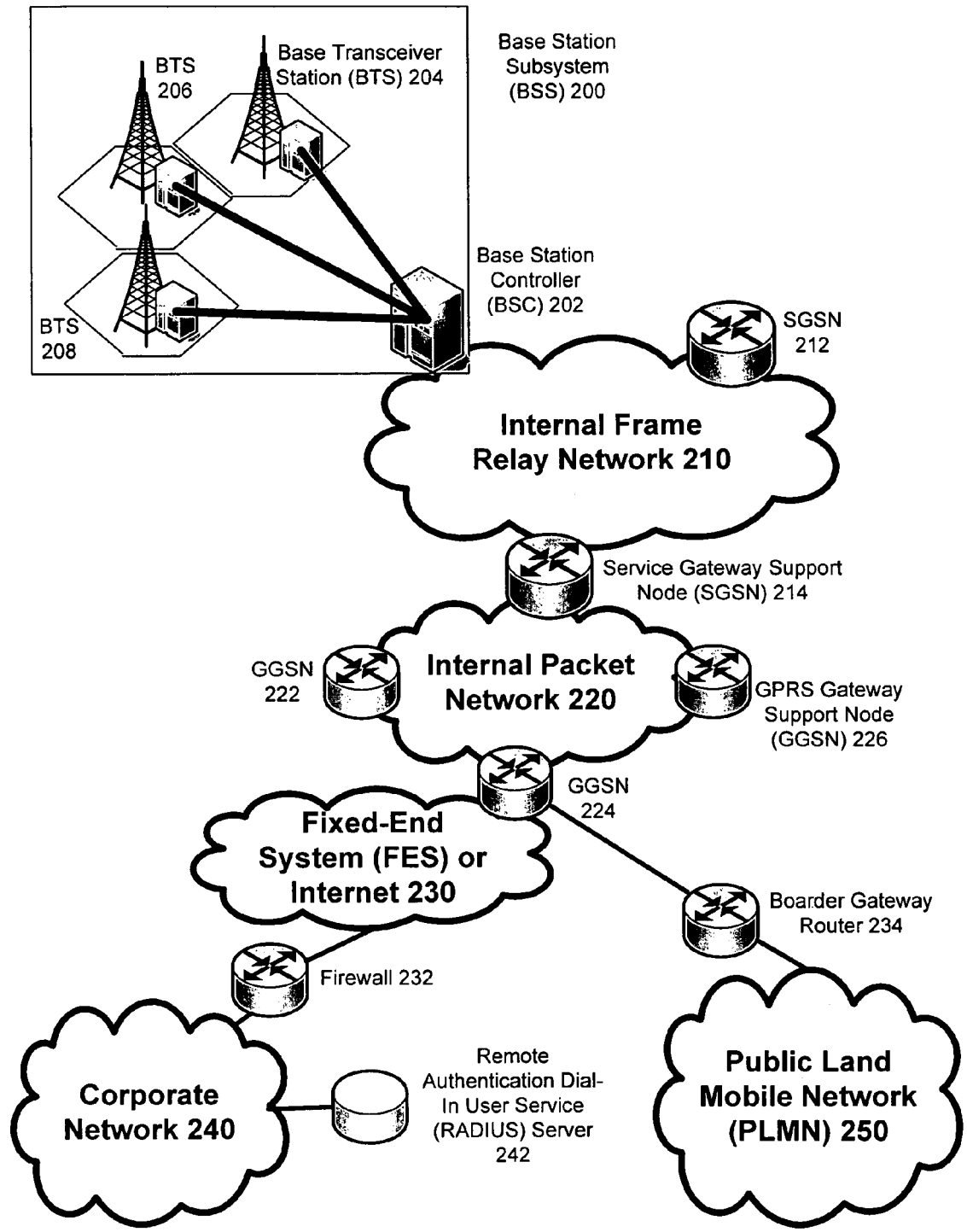
FIG. 4A illustrates an overview of a network environment suitable for service by embodiments of the invention.

FIG. 4A depicts an overall block diagram of an exemplary packet-based mobile cellular network environment, such as a GPRS network, in which the invention may be practiced. In such an environment, there are a plurality of Base Station Subsystems ("BSS") 200 (only one is shown), each of which comprises a Base Station Controller ("BSC") 202 serving a plurality of Base Transceiver Stations ("BTS") such as BTSs 204, 206, and 208. BTSs 204, 206, 208, etc. are the access points where users of packet-based mobile devices become connected to the wireless network. In exemplary fashion, the packet traffic originating from user devices is transported over the air interface to a BTS 208, and from the BTS 208 to the BSC 202. Base station subsystems, such as BSS 200, are a part of internal frame relay network 210 that may include Service GPRS Support Nodes ("SGSN") such as SGSN 212 and 214. Each SGSN is in turn connected to an internal packet network 220 through which a SGSN 212, 214, etc. can route data packets to and from a plurality of gateway GPRS support nodes (GGSN) 222, 224, 226, etc. As illustrated, SGSN 214 and GGSNs 222, 224, and 226 are part of internal packet network 220. Gateway GPRS serving nodes 222, 224 and 226 mainly provide an interface to external Internet Protocol ("IP") networks such as Public Land Mobile Network ("PLMN") 250, corporate intranets 240, or Fixed-End System ("FES") or the public Internet 230. As illustrated, subscriber corporate network 240 may be connected to GGSN 224 via firewall 232; and PLMN 250 is connected to GGSN 224 via boarder gateway router 234. The Remote Authentication Dial-In User Service ("RADIUS") server 242 may be used for caller authentication when a user of a mobile cellular device calls corporate network 240.

Generally, there can be four different cell sizes in a GSM network—macro, micro, pico and umbrella cells. The coverage area of each cell is different in different environments. Macro cells can be regarded as cells where the base station antenna is installed in a mast or a building above average roof top level. Micro cells are cells whose antenna height is under average roof top level; they are typically used in urban areas. Pico cells are small cells having a diameter is a few dozen meters; they are mainly used indoors. On the other hand, umbrella cells are used to cover shadowed regions of smaller cells and fill in gaps in coverage between those cells.

Figure 4B:
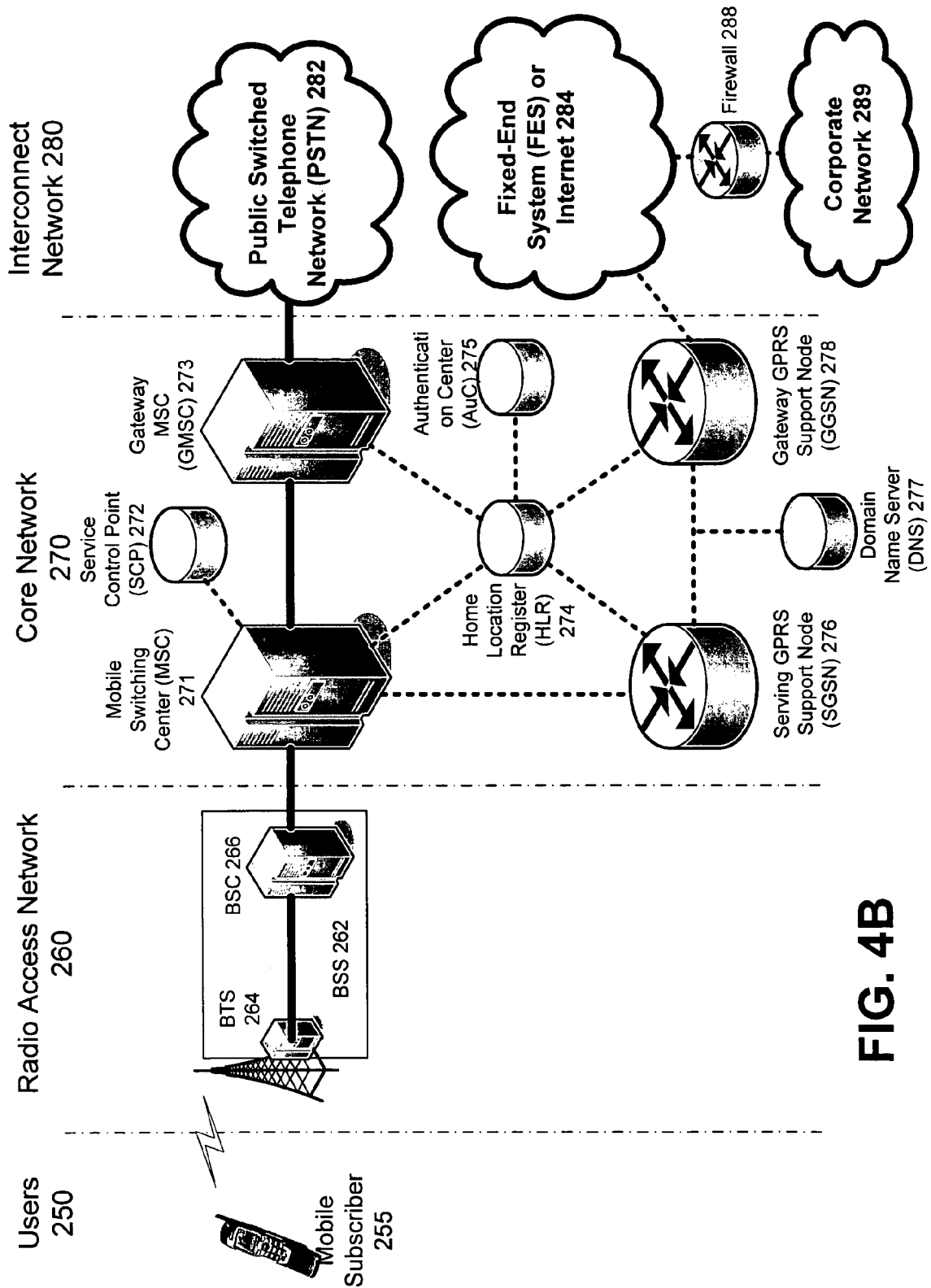
FIG. 4B illustrates a GPRS network architecture that may incorporate various aspects of the invention.

FIG. 4B illustrates the architecture of a typical GPRS network as segmented into four groups: users 250, radio access network 260, core network 270, and interconnect network 280. Users 250 comprise a plurality of end users (though only mobile subscriber 255 is shown in FIG. 4B). Radio access network 260 comprises a plurality of base station subsystems such as BSSs 262, which include BTSs 264 and BSCs 266.

Core network 270 comprises a host of various network elements. As illustrated here, core network 270 may comprise Mobile Switching Center ("MSC") 271, Service Control Point ("SCP") 272, gateway MSC 273, SGSN 276, Home Location Register ("HLR") 274, Authentication Center ("AuC") 275, Domain Name Server ("DNS") 277, and GGSN 278. Interconnect network 280 also comprises a host of various networks and other network elements. As illustrated in FIG. 4B, interconnect network 280 comprises Public Switched Telephone Network ("PSTN") 282, Fixed-End System ("FES") or Internet 284, firewall 288, and Corporate Network 289.

A mobile switching center can be connected to a large number of base station controllers. At MSC 271, for instance, depending on the type of traffic, the traffic may be separated in that voice may be sent to Public Switched Telephone Network ("PSTN") 282 through Gateway MSC ("GMSC") 273, and/or data may be sent to SGSN 276, which then sends the data traffic to GGSN 278 for further forwarding.

When MSC 271 receives call traffic, for example, from BSC 266, it sends a query to a database hosted by SCP 272. The SCP 272 processes the request and issues a response to MSC 271 so that it may continue call processing as appropriate.

The HLR 274 is a centralized database for users to register to the GPRS network. HLR 274 stores static information about the subscribers such as the International Mobile Subscriber Identity ("IMSI"), subscribed services, and a key for authenticating the subscriber. HLR 274 also stores dynamic subscriber information such as the current location of the mobile subscriber. Associated with HLR 274 is AuC 275. AuC 275 is a database that contains the algorithms for authenticating subscribers and includes the associated keys for encryption to safeguard the user input for authentication.

In the following, depending on context, the term "mobile subscriber" sometimes refers either to the end user and sometimes to the actual portable device used by an end user of the mobile cellular service. When a mobile subscriber turns on his or her mobile device, the mobile device goes through an attach process by which the mobile device attaches to an SGSN of the GPRS network. In FIG. 4B, when mobile subscriber 255 initiates the attach process by turning on the network capabilities of the mobile device, an attach request is sent by mobile subscriber 255 to SGSN 276. The SGSN 276 queries another SGSN, to which mobile subscriber 255 was attached before, for the identity of mobile subscriber 255. Upon receiving the identity of mobile subscriber 255 from the other SGSN, SGSN 276 requests more information from mobile subscriber 255. This information is used to authenticate mobile subscriber 255 to SGSN 276 by HLR 274. Once verified, SGSN 276 sends a location update to HLR 274 indicating the change of location to a new SGSN, in this case SGSN 276. HLR 274 notifies the old SGSN, to which mobile subscriber 255 was attached before, to cancel the location process for mobile subscriber 255. HLR 274 then notifies SGSN 276 that the location update has been performed. At this time, SGSN 276 sends an Attach Accept message to mobile subscriber 255, which in turn sends an Attach Complete message to SGSN 276.

After attaching itself with the network, mobile subscriber 255 then goes through the authentication process. In the authentication process, SGSN 276 sends the authentication information to HLR 274, which sends information back to SGSN 276 based on the user profile that was part of the user's initial setup. The SGSN 276 then sends a request for authentication and ciphering to mobile subscriber 255. The mobile subscriber 255 uses an algorithm to send the user identification (ID) and password to SGSN 276. The SGSN 276 uses the same algorithm and compares the result. If a match occurs, SGSN 276 authenticates mobile subscriber 255.

Next, the mobile subscriber 255 establishes a user session with the destination network, corporate network 289, by going through a Packet Data Protocol ("PDP") activation process. Briefly, in the process, mobile subscriber 255 requests access to the Access Point Name ("APN"), for example, UPS.com (e.g., which can be corporate network 279) and SGSN 276 receives the activation request from mobile subscriber 255. SGSN 276 then initiates a Domain Name Service ("DNS") query to learn which GGSN node has access to the UPS.com APN. The DNS query is sent to the DNS server within the core network 270, such as DNS 277, which is provisioned to map to one or more GGSN nodes in the core network 270. Based on the APN, the mapped GGSN 278 can access the requested corporate network 279. The SGSN 276 then sends to GGSN 278 a Create Packet Data Protocol ("PDP") Context Request message that contains necessary information. The GGSN 278 sends a Create PDP Context Response message to SGSN 276, which then sends an Activate PDP Context Accept message to mobile subscriber 255.

Once activated, data packets of the call made by mobile subscriber 255 can then go through radio access network 260, core network 270, and interconnect network 280, in particular fixed-end system or Internet 284 and firewall 288, to reach corporate network 289.

Thus, network elements that may implicate the functionality of the policy based service provisioning system in accordance with the invention may include but are not limited to Gateway GPRS Support Node tables, Fixed End System router tables, firewall systems, VPN tunnels, and any number of other network elements as required by the particular digital network.

Figure 4C:
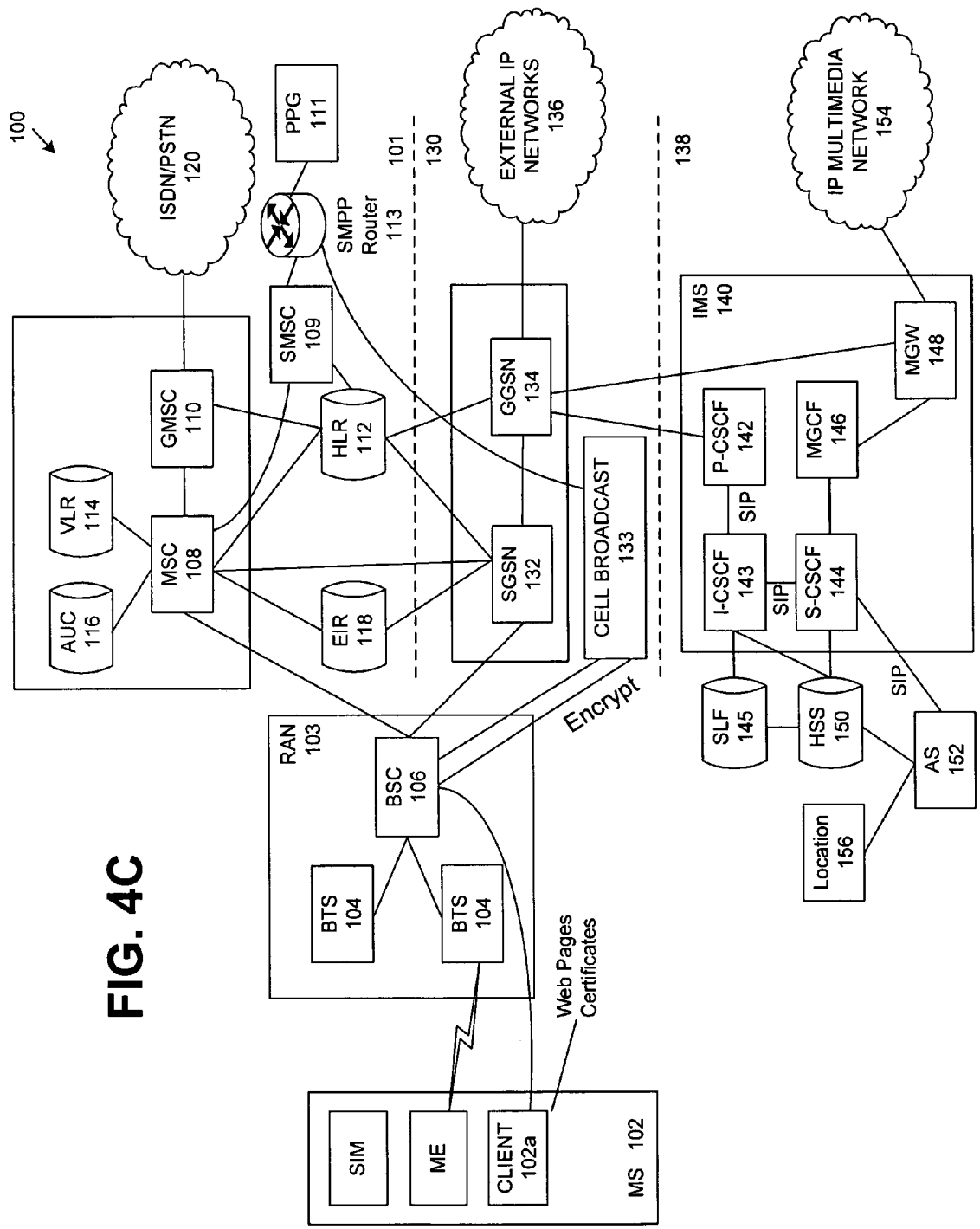
FIG. 4C illustrates an alternate block diagram of an exemplary GSM/GPRS/IP multimedia network architecture in which the invention may be employed.

FIG. 4C shows another exemplary block diagram view of a GSM/GPRS/IP multimedia network architecture 100 in which the policy based service provisioning between home and visited networks of the present invention may be incorporated. As illustrated, architecture 100 of FIG. 4C includes a GSM core network 101, a GPRS network 130 and an IP multimedia network 138. The GSM core network 101 includes a Mobile Station (MS) 102, at least one Base Transceiver Station (BTS) 104 and a Base Station Controller (BSC) 106. The MS 102 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The BTS 104 is physical equipment, such as a radio tower, that enables a radio interface to communicate with the MS. Each BTS may serve more than one MS. The BSC 106 manages radio resources, including the BTS. The BSC may be connected to several BTSs. The BSC and BTS components, in combination, are generally referred to as a base station (BSS) or radio access network (RAN) 103.

The GSM core network 101 also includes a Mobile Switching Center (MSC) 108, a Gateway Mobile Switching Center (GMSC) 110, a Home Location Register (HLR) 112, Visitor Location Register (VLR) 114, an Authentication Center (AuC) 118, and an Equipment Identity Register (EIR) 116. The MSC 108 performs a switching function for the network. The MSC also performs other functions, such as registration, authentication, location updating, handovers, and call routing. The GMSC 110 provides a gateway between the GSM network and other networks, such as an Integrated Services Digital Network (ISDN) or Public Switched Telephone Networks (PSTNs) 120. In other words, the GMSC 110 provides interworking functionality with external networks.

The HLR 112 is a database that contains administrative information regarding each subscriber registered in a corresponding GSM network. The HLR 112 also contains the current location of each MS. The VLR 114 is a database that contains selected administrative information from the HLR 112. The VLR contains information necessary for call control and provision of subscribed services for each MS currently located in a geographical area controlled by the VLR. The HLR 112 and the VLR 114, together with the MSC 108, provide the call routing and roaming capabilities of GSM. The AuC 116 provides the parameters needed for authentication and encryption functions. Such parameters allow verification of a subscriber's identity. The EIR 118 stores security-sensitive information about the mobile equipment.

A Short Message Service Center (SMSC) 109 allows one-to-one Short Message Service (SMS) messages to be sent to/from the MS 102. A Push Proxy Gateway (PPG) 111 is used to "push" (i.e., send without a synchronous request) content to the MS 102. The PPG 111 acts as a proxy between wired and wireless networks to facilitate pushing of data to the MS 102. A Short Message Peer to Peer (SMPP) protocol router 113 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 102 sends a location update including its current location information to the MSC/VLR, via the BTS 104 and the BSC 106. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 130 is logically implemented on the GSM core network architecture by introducing two packet-switching network nodes, a serving GPRS support node (SGSN) 132, a cell broadcast and a Gateway GPRS support node (GGSN) 134. The SGSN 132 is at the same hierarchical level as the MSC 108 in the GSM network. The SGSN controls the connection between the GPRS network and the MS 102. The SGSN also keeps track of individual MS's locations and security functions and access controls.

A Cell Broadcast Center (CBC) 133 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 134 provides a gateway between the GPRS network and a public packet network (PDN) or other IP networks 136. That is, the GGSN provides interworking functionality with external networks, and sets up a logical link to the MS through the SGSN. When packet-switched data leaves the GPRS network, it is transferred to an external TCP-IP network 136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 130 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 138 was introduced with 3GPP Release 5, and includes an IP multimedia subsystem (IMS) 140 to provide rich multimedia services to end users. A representative set of the network entities within the IMS 140 are a call/session control function (CSCF), a media gateway control function (MGCF) 146, a media gateway (MGW) 148, and a master subscriber database, called a home subscriber server (HSS) 150. The HSS 150 may be common to the GSM network 101, the GPRS network 130 as well as the IP multimedia network 138.

The IP multimedia system 140 is built around the call/session control function, of which there are three types: an interrogating CSCF (I-CSCF) 143, a proxy CSCF (P-CSCF) 142, and a serving CSCF (S-CSCF) 144. The P-CSCF 142 is the MS's first point of contact with the IMS 140. The P-CSCF 142 forwards session initiation protocol (SIP) messages received from the MS to an SIP server in a home network (and vice versa) of the MS. The P-CSCF 142 may also modify an outgoing request according to a set of rules defined by the network operator (for example, address analysis and potential modification).

The I-CSCF 143, forms an entrance to a home network and hides the inner topology of the home network from other networks and provides flexibility for selecting an S-CSCF. The I-CSCF 143 may contact a subscriber location function (SLF) 145 to determine which HSS 150 to use for the particular subscriber, if multiple HSS's 150 are present. The S-CSCF 144 performs the session control services for the MS 102. This includes routing originating sessions to external networks and routing terminating sessions to visited networks. The S-CSCF 144 also decides whether an application server (AS) 152 is required to receive information on an incoming SIP session request to ensure appropriate service handling. This decision is based on information received from the HSS 150 (or other sources, such as an application server 152). The AS 152 also communicates to a location server 156 (e.g., a Gateway Mobile Location Center (GMLC)) that provides a position (e.g., latitude/longitude coordinates) of the MS 102.

The HSS 150 contains a subscriber profile and keeps track of which core network node is currently handling the subscriber. It also supports subscriber authentication and authorization functions (AAA). In networks with more than one HSS 150, a subscriber location function provides information on the HSS 150 that contains the profile of a given subscriber.

The MGCF 146 provides interworking functionality between SIP session control signaling from the IMS 140 and ISUP/BICC call control signaling from the external GSTN networks (not shown). It also controls the media gateway (MGW) 148 that provides user-plane interworking functionality (e.g., converting between AMR- and PCM-coded voice). The MGW 148 also communicates with other IP multimedia networks 154.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While the present invention has been described in connection with the preferred embodiments of the various Figures, it is to be understood that other similar embodiments may be used or modifications and additions may be made to the described embodiment for performing the same function of the present invention without deviating therefrom. For example, one skilled in the art will recognize that the present invention as described in the present application may apply to any environment, whether wired or wireless, and may be applied to any number of such devices connected via a communications network and interacting across the network. Therefore, the present invention should not be limited to any single embodiment, but rather should be construed in breadth and scope in accordance with the appended claims.

What is claimed is:

1. A method for processing a request for service, comprising:
    determining, by a home network device of a home network comprising a processor, policy based service information, the policy based service information comprising network congestion level information and home network conditions, and subscriber information, the subscriber information comprising subscriber identity information and subscriber location information for use in processing a request for service applicable to a visited network device of a visited network, wherein the policy based service information indicates at least that, in response to the request for service being determined to comprise requirement information representative of a quality of service requirement comprising a time frame performance requirement, the request for service is to be serviced by the home network device and that, in response to the request for service being determined not to comprise the requirement information, the request for service is to be serviced by the visited network device;
    transmitting, by the home network device, the policy based service information and the subscriber information to the visited network device;
    receiving, by the home network device via the visited network device, a first request for service from a mobile device, wherein the first request for service is received by the home network device in response to the request for service being determined to comprise the quality of service requirement; and
    receiving, by the home network device via the visited network device, a second request for service from the mobile device, wherein the second request for service is received by the home network device in response to the request for service being determined not to comprise the quality of service requirement.

2. The method of claim 1, further comprising allocating resources by the home network device, the resources comprising servers, media gateways, and edge devices to meet the quality of service requirement.

3. The method of claim 1, wherein the transmitting by the home network device of the policy based service information comprises transmitting the policy information in response to determining a pre-defined criterion comprising at least a pre-determined threshold for home network traffic levels is satisfied at the home network and transmitting the policy based service information and the subscriber information by the home network device from a serving call session control function of the home network to a proxy call session control function of the visited network.

4. The method of claim 3, wherein the determining that the pre-defined criterion is satisfied by the home network device comprises determining based on an algorithm.

5. The method of claim 4, wherein the determining that the pre-defined criterion is satisfied by the home network device comprises determining based on a static algorithm.

6. The method of claim 5, wherein the determining that the pre-defined criterion is satisfied by the home network device comprises determining that a statically provisioned variable meets the pre-defined criterion.

7. The method of claim 6, wherein the determining that the pre-defined criterion is satisfied by the home network device comprises determining that a defined time interval has passed by comparing the defined time interval to a current time interval, the current time interval comprising a time difference between a first transmitting time comprising a time when a transmitting was performed last and a second transmitting time comprising a time of a current transmitting.

8. The method of claim 4, wherein the determining that the pre-defined criterion is satisfied by the home network device comprises determining based on a dynamic algorithm.

9. The method of claim 8, wherein the determining that the pre-defined criterion is satisfied by the home network device comprises determining that a dynamic parameter meets the pre-defined criterion.

10. The method of claim 9, wherein the determining that the pre-defined criterion is satisfied comprises determining by the home network device that a congestion level of the home network has reached a pre-defined level.

11. The method of claim 1, wherein the transmitting by the home network device comprises transmitting the policy based service information to a navigation component of the visited network device that applies the policy based service information of the home network device in order to route roaming traffic to the visited network device of the visited network from the home network devices of the home network.

12. The method of claim 1, wherein the transmitting by the home network device comprises transmitting the policy based service information to a navigation component of the visited network device, and further comprising:

classifying a first request for service from the home network device of the home network as a roaming request to the visited network device of the visited network; and applying a policy by the navigation component of the visited network device transmitted from the home network device.

13. The method of claim 12, wherein the classifying by the home network device comprises classifying that the first request for service performed the quality of service requirement according to a policy of the home network device.

14. The method of claim 13, further comprising initiating the receiving by the home network device of the home network in response to the quality of service requirement being employed according to the policy of the home network device.

15. The method of claim 13, further comprising: instructing, by the home network device, processing of the second request for service by the visited network device in response to the quality of service requirement being absent from the request for service.

16. The method of claim 1, further comprising transmitting a result of processing the request for service from the home network device to the visited network device including returning the result to the home network device.

17. The method of claim 1, wherein the transmitting includes transmitting a service level agreement from the home network device of the home network to the visited network device of the visited network.

18. A non-transitory computer readable storage medium comprising computer executable instructions that, in response to execution, cause a computing system to perform operations, comprising: receiving, by a visited network device of a visited network comprising a processor, policy based service information, the policy based service information comprising network congestion level information and home network conditions, and subscriber information, the subscriber information comprising subscriber identity information and subscriber location information determined by a subscriber network device of a home network to process a request for service by the visited network device, wherein the policy based service information indicates at least that in response to the request for service being determined to comprise requirement information representative of a quality of service requirement comprising a time frame performance requirement, the request for service is to be serviced by the subscriber network device and in response to the request for service being determined not to comprise the requirement information, the request for service is to be serviced by the visited network device; receiving, by the visited network device, a request for authentication and verification from a subscriber device of the home network to establish a call session comprising a request for service; receiving by the visited network device, an initial request for service from the subscriber device of the home network; and in response to the initial request for service including the quality of service requirement associated with the subscriber network device as set forth in the policy based service information, forwarding the initial request for service to the subscriber network device for processing; and in response to the initial request for service not including the quality of service requirement associated with the subscriber network device as set forth in the policy based service information, processing the initial request for service by the visited network device; receiving, by the visited network device, a subsequent request for service from the subscriber device of the home network; and in response to the subsequent request for service including the quality of service requirement associated with the subscriber network device as set forth in the policy based service information, forwarding the subsequent request for service to the subscriber network device for servicing; and in response to the subsequent request for service not including the quality of service requirement associated with the subscriber network device as set forth in the policy based service information, processing the subsequent request for service at the visited home network device.

19. The non-transitory computer readable storage medium of claim 18, further comprising receiving by the visited network device an indication of the subscriber network device allocating resources, the resources comprising servers, media gateways, and edge devices to meet the quality of service requirement.

20. The non-transitory computer readable storage medium of claim 18, further comprising receiving by the visited network device the policy based service information in response to determining by the subscriber network device a pre-defined criterion comprising at least a predetermined threshold for home network traffic levels being satisfied at the home network and further comprising receiving by the visited network device the policy based service information and the subscriber information from a serving call session control function of the subscriber network device to a proxy call session control function of the visited network.

21. The non-transitory computer readable storage medium of claim 20, wherein the determining that the pre-determined criterion is satisfied comprises determining by the subscriber network device based on an algorithm.

22. The non-transitory computer readable storage medium of claim 20, wherein the determining that the pre-determined criterion is satisfied by the subscriber network device comprises determining based on a static algorithm.

23. The non-transitory computer readable storage medium of claim 22, wherein the determining that the pre-determined criterion is satisfied comprises determining by the subscriber network device whether a statically provisioned variable meets the pre-defined criterion.

24. The non-transitory computer readable storage medium of claim 23, wherein the determining that the pre-determined criterion is satisfied comprises determining by the subscriber network device that a defined time interval has passed by comparing the defined time interval to a current time interval, the current time interval comprising a time difference between a first transmitting time comprising a time when a transmitting was last received and a second transmitting time comprising a time a current transmitting was received.

25. The non-transitory computer readable storage medium of claim 20, wherein the determining that the pre-determined criterion is satisfied by the subscriber network device comprises determining based on a dynamic algorithm.

26. The non-transitory computer readable storage medium of claim 25, wherein the determining that the pre-determined criterion is satisfied by the subscriber network device comprises determining that a dynamic parameter meets the pre-defined criterion.

27. The non-transitory computer readable storage medium of claim 26, wherein the determining that the pre-determined criterion is satisfied by the subscriber network device comprises determining that a congestion level of the visited network has reached a pre-defined level.

28. The non-transitory computer readable storage medium of claim 18, the operations further comprising receiving the policy based service information by a navigation component of the visited network that applies the policy based service information of the subscriber network device in order to route roaming traffic to the visited network device from the subscriber network device of the home network.

29. The non-transitory computer readable storage medium of claim 18, the operations further comprising receiving the policy based service information by a navigation component of the visited network device that classifies the initial request for service from the subscriber network device of the home network roaming to the visited network device as a transmitted policy from the subscriber network device of the home network to the navigation component of the visited network device.

30. The non-transitory computer readable storage medium of claim 29, the operations further comprising:
classifying by the visited network device that the initial request for service demands the quality of service requirement associated with processing by the subscriber network device according to a policy of the subscriber network device.

31. The non-transitory computer readable storage medium of claim 30, the operations further comprising:
initiating by the visited network device the forwarding of the initial request from the visited network device to the subscriber network device in response to the quality of service requirement being demanded by the initial request.

32. The non-transitory computer readable storage medium of claim 30, the operations further comprising:
servicing, by the visited network device, the initial request for service in response to the quality of service requirement missing from the request for service.

33. The non-transitory computer readable storage medium of claim 18, the operations further comprising sending, via the visited network device, a processing result to the subscriber network device.

34. The non-transitory computer readable storage medium of claim 18, the operations further comprising receiving a service level agreement by the visited network device, the service level agreement generated by the subscriber network device.

35. A method for processing a request for service in a network, comprising: receiving, by a visited network device of a visited network, policy based service information, the policy based service information comprising network conditions information and network congestion level information and subscriber information comprising subscriber identity information and subscriber location information from a home network device, the policy based service information indicating the home network device is to process a service request, the service request comprising a quality of service requirement comprising a time frame performance requirement and based on a dynamic provisioning logic that enforce policy based service information of at least one network carrier and the visited network device is to process the service request where the quality of service requirement is absent; receiving, by the visited network device, a request for authentication from a subscriber device of the home network to establish a call session comprising a request for service; receiving, by the visited network device, a first request for service from the subscriber device; determining, by the visited network device, that the visited network device is to service the first request for service based upon the policy based service information; receiving, by the visited network device, a second request for service from the subscriber device; and determining, by the visited network device, that the visited network device is to service the second request for service based upon the policy based service information.

36. The method of claim 35, further comprising:
forwarding by the visited network device at least one of the first request for service or the second request for service to the home network device in response to the first request for service or the second request for service including a quality of service requirement that the visited network device is unable to fulfill in accord with the policy based service information.

37. The method of claim 35, further comprising:
wherein the receiving of the policy based service information by the visited network device as a function of a performance threshold employed by the home network device.

38. The method of claim 35, further comprising associating by the visited network device the policy based service information with the subscriber information.

39. A system, comprising: at least one memory that stores executable instructions; and at least one processor, coupled to the at least one memory, that facilitates execution of the executable instructions to perform operations, comprising: receiving by a visited network device policy based service information comprising network condition information and network congestion level information and subscriber information comprising subscriber identity information and subscriber location information transmitted from a home network device to a visited network device, the policy based service information indicates the home network device is to process a service request when the service request comprises a quality of service requirement comprising a time frame performance requirement, and the visited network device is to process the service request where the quality of service requirement is absent; receiving by a visited network device a request for authentication from a subscriber device of the home network to establish a call session comprising a request for service; receiving by a visited network device a first request for service from the subscriber device of the home network; receiving by a visited network device a second request for service from the subscriber device of the home network; and determining, based upon the policy based service information, whether the visited network device or the home network device is to service the first request for service or the second request for service.

40. The system of claim 39, wherein the at least one processor further facilitates the execution of the computer-executable instructions to at least
forward the first request for service or the second request for service to the home network in response to the first request for service or the second request for service including a quality of service requirement that the visited network device is unable to fulfill in accord with the policy based service information.

* * * * *